United States Patent
Pedersen (10) Patent No.: US 10,519,687 B2
(45) Date of Patent: Dec. 31, 2019

(54) METHOD OF ERECTING A TETHERED WIND TURBINE TOWER

(71) Applicant: Vestas Wind Systems A/S, Aarhus N. (DK)

(72) Inventor: Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 45 days.

(21) Appl. No.: 15/578,006

(22) PCT Filed: Jun. 15, 2016

(86) PCT No.: PCT/DK2016/050184
§ 371 (c)(1),
(2) Date: Nov. 29, 2017

(87) PCT Pub. No.: WO2016/206689
PCT Pub. Date: Dec. 29, 2016

(65) Prior Publication Data
US 2018/0291642 A1    Oct. 11, 2018

(30) Foreign Application Priority Data

Jun. 23, 2015    (DK) .................................. 2015 70384

(51) Int. Cl.
*F03D 13/20*    (2016.01)
*E04H 12/34*    (2006.01)
(Continued)

(52) U.S. Cl.
CPC .............. *E04H 12/34* (2013.01); *E04H 12/20* (2013.01); *F03D 13/10* (2016.05);
(Continued)

(58) Field of Classification Search
CPC ......... E04H 12/20; E04H 12/34; F03D 13/10; F03D 13/40; F05B 2230/61; B66D 1/365;
(Continued)

(56) References Cited

U.S. PATENT DOCUMENTS 503,048 A * 8/1893 Jacobs .................... F03D 80/00
417/334
3,219,224 A * 11/1965 Anderson ............... E04H 12/30
220/567
(Continued)

FOREIGN PATENT DOCUMENTS

DE         3940905 A1    6/1990
JP      2000204792 A    7/2000
(Continued)

OTHER PUBLICATIONS

European Patent Office, International Search Report and Written Opinion in PCT Application No. PCT/DK2016/050184, dated Sep. 15, 2016.
(Continued)

*Primary Examiner* — Joshua J Michener
*Assistant Examiner* — James J Buckle, Jr.
(74) *Attorney, Agent, or Firm* — Wood Herron & Evans LLP (57) ABSTRACT

The invention relates to a method of erecting a tower such as a wind turbine tower tethered by a number of cables where each of the cables extend between the tower and an anchoring element on an anchor block. The method comprises attaching at least some of the tethering cables to the tower, detachably fastening a motorized winch on an anchor block and connecting the wire of the winch to the end of a tethering cable. The winch is then operated to wind up the wire of the winch pulling the cable end towards the anchor block and into position for fastening the cable end to the anchoring element, where the cable end is then fastened to the anchoring element while held in position by the winch. The invention further relates to the use of a motorized winch to connect a cable to an anchor block when erecting a tower tethered by a number of cables as mentioned above.

11 Claims, 6 Drawing Sheets

(51) Int. Cl.
*F03D 13/10* (2016.01)
*E04H 12/20* (2006.01)

(52) U.S. Cl.
CPC ....... *F05B 2230/60* (2013.01); *F05B 2230/61* (2013.01); *Y02E 10/72* (2013.01); *Y02P 70/523* (2015.11)

(58) Field of Classification Search
CPC ........... B66D 1/60; F01D 5/00; E02D 27/425; Y02E 10/72; Y02E 10/728
USPC ...................................................... 52/745.18
See application file for complete search history.

(56) References Cited

U.S. PATENT DOCUMENTS

| | | | | |
|---|---|---|---|---|
| 4,266,911 A * | 5/1981 | Helm | ...................... | F03D 13/20 416/9 |
| 4,979,871 A * | 12/1990 | Reiner | .................... | F03D 3/068 415/4.2 |
| 6,364,609 B1 * | 4/2002 | Barnes | .................... | F03D 3/005 416/142 |
| 6,979,175 B2 * | 12/2005 | Drake | ........................ | F03D 1/00 416/11 |
| 7,683,498 B2 * | 3/2010 | Stommel | ................... | F03D 7/02 290/44 |
| 8,083,212 B2 * | 12/2011 | Numajiri | ................. | B66C 1/108 254/278 |
| 8,341,918 B2 * | 1/2013 | Jolly | ....................... | E04H 12/34 52/745.11 |
| 8,464,497 B2 * | 6/2013 | Lambert | ................. | E04H 12/20 52/745.17 |
| 8,544,237 B2 * | 10/2013 | Zillmer | ................... | B66C 23/18 52/745.17 |
| 8,544,923 B2 * | 10/2013 | Inda | .......................... | B66C 1/66 294/215 |
| 8,595,931 B2 * | 12/2013 | Riddell | ................... | B66C 1/108 29/889.6 |
| 8,596,614 B2 * | 12/2013 | Numajiri | ................. | F03D 80/50 254/329 |
| 9,388,599 B2 * | 7/2016 | Homsi | .................... | F03D 13/20 |
| 9,617,752 B2 * | 4/2017 | Wagner | ................... | F03D 13/20 |
| 9,657,495 B2 * | 5/2017 | Lockwood | ............ | E04H 12/342 |
| 9,869,293 B2 * | 1/2018 | Nielsen | ................... | F03D 80/82 |
| 9,932,718 B2 * | 4/2018 | Blevins | ................... | E02D 5/801 |
| 2002/0095878 A1 * | 7/2002 | Henderson | ............ | E04H 12/182 52/116 |
| 2005/0151376 A1 * | 7/2005 | Bernhoff | ................ | F03D 3/005 290/44 |
| 2006/0138782 A1 * | 6/2006 | Friesth | .................... | F03D 1/025 290/55 |
| 2008/0078128 A1 * | 4/2008 | Livingston | ............. | F03D 13/10 52/40 |
| 2010/0319983 A1 * | 12/2010 | De Abreu | ............... | E04H 12/20 174/45 TD |
| 2011/0016804 A1 | 1/2011 | Howard et al. | | |
| 2012/0086210 A1 * | 4/2012 | Gray | ........................ | F03D 5/00 290/55 |
| 2012/0234954 A1 * | 9/2012 | Pereira | .................... | E04H 12/20 242/148 |
| 2014/0360015 A1 * | 12/2014 | Lohan | ................... | F03D 1/0658 29/889.1 |
| 2014/0361540 A1 * | 12/2014 | Knight | .................... | F03D 80/88 290/44 |
| 2015/0232307 A1 * | 8/2015 | Holloway | ............... | B66C 1/108 414/800 |
| 2015/0300175 A1 * | 10/2015 | Pfeiffer | ................. | F03D 1/0658 29/889.1 |
| 2016/0168815 A1 * | 6/2016 | Kemp | ..................... | E04H 12/20 52/157 |
| 2017/0320711 A1 * | 11/2017 | Hampton | ................. | B66D 1/38 |
| 2018/0066633 A1 * | 3/2018 | Bojanovich | ............. | F03D 7/06 |

FOREIGN PATENT DOCUMENTS

WO    2008099129 A2    8/2008
WO    2014108789 A1    7/2014

OTHER PUBLICATIONS

Danish Patent and Trademark Office, Search Report in PA 2015 70384, dated Jan. 22, 2016.
Endurance Wind Power, Inc., Tilt-Up Installation Manual, XP055300999, Dec. 22, 2008.
Kingspan Wind, KW6 748 Wind Turbine Installation Manual, XP055300865, Jul. 1, 2013.

* cited by examiner

METHOD OF ERECTING A TETHERED WIND TURBINE TOWER

FIELD OF THE INVENTION

The present invention relates to a method of erecting a (wind turbine) tower wherein the tower is tethered by a number of cables extending between anchoring elements on anchor blocks and attachment elements at the tower.

BACKGROUND OF THE INVENTION

A towers or a masts may be constructed in many different ways according to its function and the requirements to the tower, such as size requirements, the load carrying capacity of the tower, the types of loads it needs to withstand, transportation issues, and the possibility to place equipment in the tower etc.

A traditional tower for a wind turbine is a tubular steel tower with tower section placed on top of each other fixed to a concrete foundation. Due to transport and production restrictions, the external diameter has a limited size. Therefore, often the shell thickness is seen as the primary dimensioning parameter when increasing the tower height.

Simply increasing the tower shell thickness is however a very ineffective way of achieving increased bearing capacity and stiffness as these parameters only grow linear with the shell thickness. In comparison, increasing the diameter of the tower yields an increased bearing capacity with the diameter in the power of two, and a stiffness growing with the diameter in three.

To overcome such size limitation problem some towers comprises a number of tower sections divided by vertical joints if the diameter is optimized or further tower sections placed on top of each other if the shell thickness in increased and thereby exceed the tower section weight limitation. Other towers have increased bearing capacity by having a lower part constructed of in situ concrete or concrete elements.

Alternatively or additionally, the bearing capacity of a tower such as a wind turbine tower can be increased and the stresses reduced in parts of the tower by installing a number of cables or wires from a number of anchors or foundations to attachment points on the tower. The cables provide stability to the tower to reduce oscillations from wind and reduces the loads in the part of the tower below the cables considerably. This so-called guyed or tethered tower will to some extent be de-loaded by the wire reactions and can thereby potentially be constructed by fewer long sections with a relatively smaller and thereby more transportable diameters.

However, the tethered tower inevitably takes up more land which has to be taken into account in planning the appliance of the tower and especially during erection and maintenance of the equipment on or in the tower, where the cables needs to be taken into account and may be very much in the way. Also, for a wind turbine, the tensioning and the attachments of the cables are crucial for the wind turbine tower to withstand the varying and potentially high wind forces which in the interacting with the rotor creates complex and at times quite extreme dynamic loads.

Further, the erecting of tethered towers is often a time consuming and costly process due to the positioning and tensioning of the cables which often requires extensive use of cranes and may be complicated by the surroundings of the tower such as vegetation, uneven ground etc.

As the towers become larger and larger as is seen for example with wind turbine towers, the erecting of the tower becomes correspondingly more evolved and complex requiring larger cranes to position the tower and to attach the cables. As the cables become longer, more than one crane or repositioning of the crane several times during the erecting process may be needed to position and attach all the cables.

DESCRIPTION OF THE INVENTION

It is therefore an object of embodiments of the present invention to overcome or at least reduce some or all of the above described disadvantages of the known towers by providing an improved method of erecting a tethered tower.

It is a further object of embodiments of the invention to provide a method for erecting such guyed tower which is simple and relatively fast to effectuate and with improved handling of the cables during erection.

It is a further object of embodiments of the invention to provide a cable attachment method which more effectively and quickly aid in positioning the tethering cables and with reduced need for cranes.

So, in a first aspect the present invention relates to a method of erecting a wind turbine tower tethered by a number of cables (and configured to support a wind turbine nacelle and a rotor), each cable extending between a first end attached to an attachment element on the tower and a second end attached to an anchoring element on an anchor block. The method comprises:
 attaching at least some of the tethering cables to the tower,
 detachably fastening a motorized winch on an anchor block, the winch comprising a wire on a spool,
 connecting the wire of the winch to the second end of a tethering cable,
 winding up the wire of the winch pulling the cable end towards the anchor block and into position for fastening the cable end to the anchoring element,
 fastening the cable end to the anchoring element while held in position by the winch, and
 detaching the winch wire from the cable.

By the use of the winch, the relatively heavy and long tower cables can be effectively be pulled into position to be fastened to the anchor block with no or only minimal use of a crane. In this way, a crane need not be used to position the tower cable at the anchor block as is traditionally done. Thereby the cost of erecting the tower can be greatly reduced and even performed faster comparing to processes involving repositioning of a crane to be able to reach far enough.

The relatively thin and lighter winch wire (compared to a tower cable) can be easily pulled out and attached to the end of the tower cable with minimal need for machinery, and without necessarily having to clear the area surrounding the tower for vegetation and the like obstacles. Further, the winch wire is easily retracted to thereby pull the tower cable end into the exact desired position to be secured to the anchoring element on the anchor block. The proposed method thus advantageously provides for holding the tower cable in position while being secured which improves the safety as well as the quality of the attachment of the cables.

The motorized or power-controlled winch is also sometimes referred to a pulling or traction hoist. The winch for example be an electric, hydraulic or air type winch. Suitable motorized winches are sold under the product name of Tirak™ by the company Tractel.

The tower erected according to the invention may be a wind turbine tower tethered by a number of cables and configured to support a wind turbine nacelle and a rotor.

The cables may each be single element cables or mooring lines, tie rods, and/or each comprise a number of wires such as multi strand type wires consisting of a number of strands each consisting of a number of wires, where the wires can be arranged in parallel side by side, bonded, twisted, or braided or combinations hereof. The cables may be made of steel and/or other materials such as Kevlar.

The anchor block could be placed on or into the ground or seabed, or could alternatively be attached to or form a part of another construction such as floating platform, depth anchors, or another tower foundation etc.

A cable may be anchored solely at the anchoring element and at the attachment element or may be supported or attached in one or more points along its length for example by connection to other cables or stiffeners.

The tower may comprise one or more tower sections joined to each other before or after being positioned on top of each other or both. The tower may form a generally cylindrical tower wall or may be comprise a truss structure or combinations hereof. The tower may be made at least partly of steel and/or concrete, and may be reinforced in places by other or additional materials.

The tower may be self-supporting both with and without the cables attached. The tower may alternatively be self-supporting only with the cables attached and tensioned. In such case the tower may be temporarily stiffened or supported by a temporary support during erection until the cables are attached.

One or more of the cables may be attached to the tower at essentially the same height or at different heights. The cables may all be attached at the same height and at even intervals around the tower to thereby distribute the forces from the cables evenly. By attaching the cables at the same height, the cables can be attached to attachment elements attached to the same tower section. Such tower section may form a special tower section specially adapted to receive the cables for example by comprising additional reinforcement compared to its neighbouring tower sections and/or by have higher strength or stiffness. Similarly, the tower may be tethered by more cables or more sets of cables attached at different heights of the tower.

The attachment elements on the tower may be formed as an integral part of the tower or may be attached to a surface of a tower wall by fastening means such as any of welding, gluing, or mechanical fastening members. Each attachment element may be configured to receive one or more cable ends. An attachment element may be configured to receive the ends of two different cables. Hereby a reduced number of attachment elements are needed to attach the cables in that each or some of the attachment elements can be used to attach two cables. Further is obtained a more precise attachment of the two cables relative to each other in that they are attached to the same attachment element whereby the location of the convergence point of the projection lines of the two cables can be more easily and precisely determined and controlled.

Two cables or more may be anchored to the same anchoring element extending to different positions at the tower at different or essentially the same height of the tower.

The tethering cables may be configured in different ways connected to the tower at different heights, or at least some of the cables or all of them connected at the same height of the tower. Similarly, the tethering cables may extend at different, the same, or partially the same angles between the anchor blocks and the attachment element on the tower. Similarly, all or some of the cables may be attached to anchor blocks the same distance away from the tower. Alternatively, all or some of the anchor blocks may be placed at different distances to the tower. The anchor block positions may for example be determined by the surface conditions, vegetation, or other structures in area around the tower. The tethering cables may extend symmetrically around the tower such as to distribute the loads on the tower evenly. Additional cables may be arranged to support the tower in specific directions with higher loads or more extreme loads.

In one tower configuration, each anchor block is configured to anchor at least two cables and each attachment element is configured to receive two cables not extending from the same anchoring elements. Hereby is obtained a tethering of the tower wherein the cables are attached in pairs to each anchor and attached in other pairs to the tower. For example, the tower may be attached by 6 cables extending between 3 anchoring elements and 3 attachment elements. Hereby is obtained that any cable can be detached from an attachment element or from an anchoring element for example for repair or exchange without jeopardizing the stability of the wind turbine tower. Also, any set of two cables can be detached from an attachment element or from an anchoring element with the tower still being suspended to some degree in all directions. This would then make room to allow for example for a crane to be moved close to the tower without interfering with any of the remaining cables, for example for a wind turbine blade to be lowered to the ground or similar.

In an embodiment of the invention, the tower comprises a number of tower sections joined to each other. Further, the attaching of at least some of the tethering cables to the tower comprises positioning a first tower section, attaching at least some of the tethering cables to a second tower section while the second tower section is on the ground, then lifting the second tower section with the attached cables onto the first tower section, and joining the second tower section to the first tower section. Hereby is obtained a method for erecting a tethered tower where the tower sections are mounted successively and where on the same time the cables are handled and managed effectively during the erection. By the proposed method, the cables are advantageously attached to the tower section while at the ground which can be done far more reliably, simple, fast, and safely than if to be done in height, where also the weather conditions may complicate the work considerably. Also, the method advantageously provides for a way to lift the cables in position at height at the same time and in the same process as the lifting of the second tower section thereby only needing to perform one lifting operation by a crane and reducing the need for the crane. This is of concern especially for the erection of offshore wind turbines. Furthermore by the proposed method is obtained that some or optionally all of the cables are ready to be mounted to the anchoring elements and to be tensioned to support the tower already when having joined the first and second tower sections. In this way the tower can be tethered as soon as possible.

The term on the ground is here to be understood in a general meaning as a base of some sort like for example a foundation, solid ground, a platform etc., such as an offshore foundation or a floating platform in the case of erecting a tower for an offshore wind turbine.

A third tower section may be attached to the second tower section while the second tower section is on the ground. Hereby as much work as possible is performed at the ground under far better working conditions than if performed in height. Hereby a better quality of the attachment may be obtained and the work may be performed faster and while having a far better safety.

In an embodiment of the invention, the cable comprises in its second end at least one cable stud and the anchoring element comprises a block socket with an opening for receiving the cable stud. The method further comprises guiding the wire of the winch through the opening in the block socket before being connected to the cable stud. Hereby the cable end with the stud can be guided into and through the opening in the block socket when the winch wire is retracted. In this way the stud is drawn into position for being secured to and fastened to the anchoring element. This operation can be performed with only minimal or completely without the need for any manual guidance of the tower cable into position which further speeds up and simplifies the attaching of the cables. The cable stud can be attached to the block socket by bolts or similar.

According to a further embodiment, the method further comprises attaching a tensioning tool to the cable and pre-tensioning the cable to a first pre-tensioning value by means of the tensioning tool. Hereby the part of the tower which has been erected can be made self-supporting and for example ready to receive a further tower section or equipment in the tower. The first pre-tensioning value may be an intermediate value lower than the final pre-tension load on the cable on the finished tower, or it may be the final pre-tension load. The pre-tensioning may be performed with the winch wire still attached to the tower cable or may be performed after the winch has been detached.

In a further embodiment, the motorized winch comprises a pair of spools with a wire on each spool, and wherein the pair of spools are arranged to be operated in unison to wind up the two wires in unison at the same speed. Hereby two winch wires can be used to pull one cable into position for fastening, thereby being able to apply approximately the double pulling force. In this way the strength requirements to the winch wires and the requirements to the winch motors can be reduced, so that even standard winches can be used in pulling in cables of 50-200 meters or more. Further, as the pair of spools of the winch can be operated in unison, the winch can easily be operated by one person. Also, the unison operation ensured that both winch wires are wound out and in the same amount, so that both wires will be loaded equally.

In yet a further embodiment, the block socket comprises two openings for receiving two cable studs, and the method further comprises guiding a wire of the winch through each of the two openings in the block socket before being connected to each of the two cable studs. This is advantageous where the tower cable is equipped with two studs for attachment to the anchoring element. Hereby each cable stud can be pulled easily and in a well-controlled manner into position for fastening and both be held in that position while being secured.

In an embodiment, the winch is fastened to the anchoring element on the anchor block. In this way the winch can be positioned so that the winch wire is pulled up in the desired direction relative to the anchoring element for the tether cable end to end in the desired position to be secured to the anchoring element.

In an embodiment, a third tower section is lifted onto and attached to the second tower section.

The method may then further comprise pre-tensioning the cable to a second pre-tensioning value by means of the tensioning tool. Hereby, the cables of the towers can be pre-tensioned in more steps according to the stage of the tower building. Hereby the cables need not be pre-tensioned to their final tensioning load before the entire tower is raised. This further makes the final pre-tensioning load on the cables more accurate.

In a further embodiment of the invention, the method further comprises positioning the tower at least partially by means of a crane and further using the crane to lift the second end of the cable and move it closer to the anchor block. Hereby the crane used for the positioning of the tower can advantageously be used to ease the positioning of the cables by lifting the cable ends to be attached to the anchor blocks as close as possible or as desired to the anchor blocks. As the winch is then used to pull the cable end the remaining way to the anchor block, the crane need not be replaced or another crane employed to make the final positioning of the cables. Also, as the crane has lifted at least some of the cable ends closer to the anchor blocks, the wire of the winch need not be as long as otherwise needed to pull the cable the entire distance, and correspondingly the motor power of the winch can be smaller.

In an embodiment of the invention, each cable is pre-tensioned to a value in the interval of 30-55% of their nominal strength, such as in the interval of 40-50% of their nominal strength. Hereby is obtained that all the cables tethering the tower are in tension at all times and under all weather conditions regardless also those cables in the leeside. Hereby the oscillations of the tower and the natural frequency of the tower remain well controlled. This is especially advantageous for wind turbine towers where the tower needs to take up the loads from the wind interacting with the rotor. By tensioning the cables to such high degree, the non-linear part of the deflection of each cable will have only an insignificant influence. Hereby, the cable deflection will have a working interval where the deviation from the linear behaviour is kept below a certain low value, say 2%. With a mainly linear behaviour of the cables is obtained that all deflections within the working interval and in all directions are linear and that the system frequency of the tethered tower has advantageously just one single value. Hereby only a limited frequency range has to be excluded from the operational parameters of the wind turbine which is important in order to be able to optimize the power production in all weather conditions.

A further aspect of the invention relates to the use of a motorized winch to connect a cable to an anchor block when erecting a wind turbine tower tethered by a number of cables. The advantages hereof are as described in the previous in relation to the method of erecting a tower.

LEGENDS TO THE FIGURES

In the following different embodiments of the invention will be described with reference to the drawings, wherein:

FIGS. 2A and B show an embodiment of an attachment of a cable between an attachment element and an anchoring element, respectively.

DETAILED DISCLOSURE OF THE INVENTION

Figure 1:
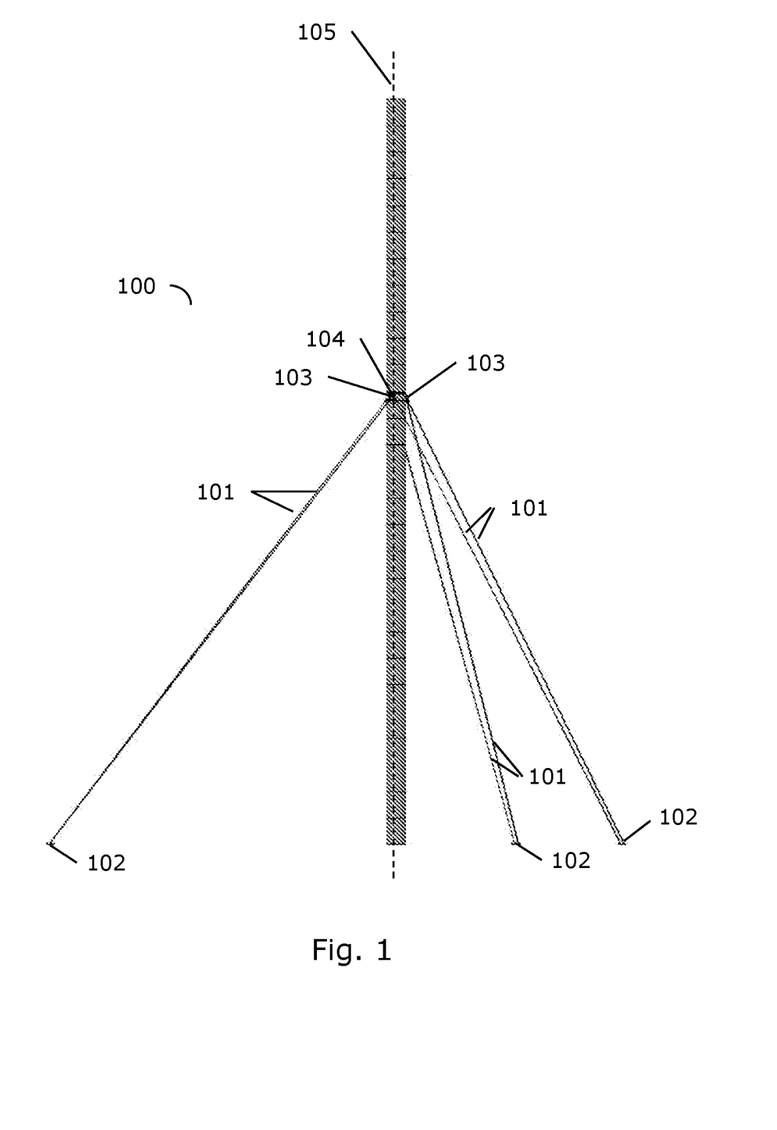
FIG. 1 shows a sketch of a tethered tower.

FIG. 1 shows a sketch of a tower 100 such as for example a wind turbine tower in which case the tower is configured to support a wind turbine nacelle and a rotor (not shown). A number of cables, 101, tethers the tower. The tower extends in a longitudinal direction along and about a central vertical longitudinal axis 105. In general, each cable 101 extends between a first cable end attached to an attachment element 103 on the tower and a second cable end attached to an anchoring element 102. In the present embodiment shown in the figure, in total six different cables 101 extend between their first cable ends attached to attachment elements 103 at a tower section 104 of the tower and their second cable ends attached to in total three different anchoring elements 102 which here are on the ground. Here, two cables extend from each anchoring element and extend in different angles to two different attachment elements at the tower but at the same height. In this embodiment, the anchoring elements 102 are placed at the same distance from the tower and at 120 degrees apart around the tower so that the cables tensioning is symmetrical. The cables here extend to the tower at an angle of approximately 45 degrees and are attached to the tower at a height just beneath the height of wind turbine blade tip when in its lowermost position. In this way the cables cannot under any weather conditions be hit by a blade. In general, any number of cables may be used to tether the tower, extend to attachment points at different heights on the tower and in different angles.

Figures 2A, 2B:
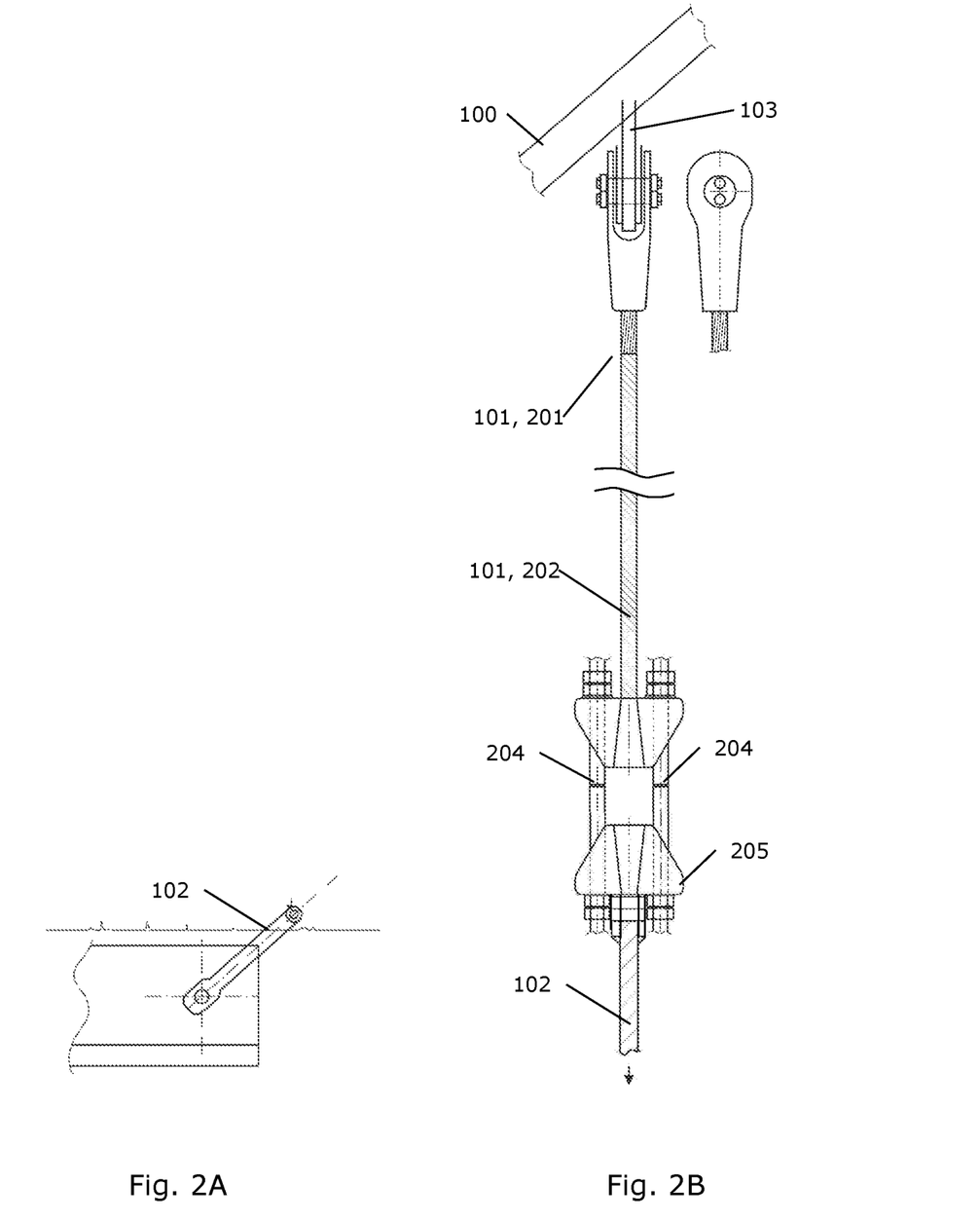

In FIG. 2B is shown in a top view an embodiment the ends of a cable 101 as attached in its first end 201 to an attachment element 103 at the tower 100, and as attached in its second end 202 to an anchor element 102. FIG. 2A shows the anchor element 102 from FIG. 2B in a side view mounted to an anchor block 203. In this embodiment, the cable 101 in its second end 202 comprises two cable studs 204 received and connected to a block socket 205 on the anchoring element 102.

Figure 3:
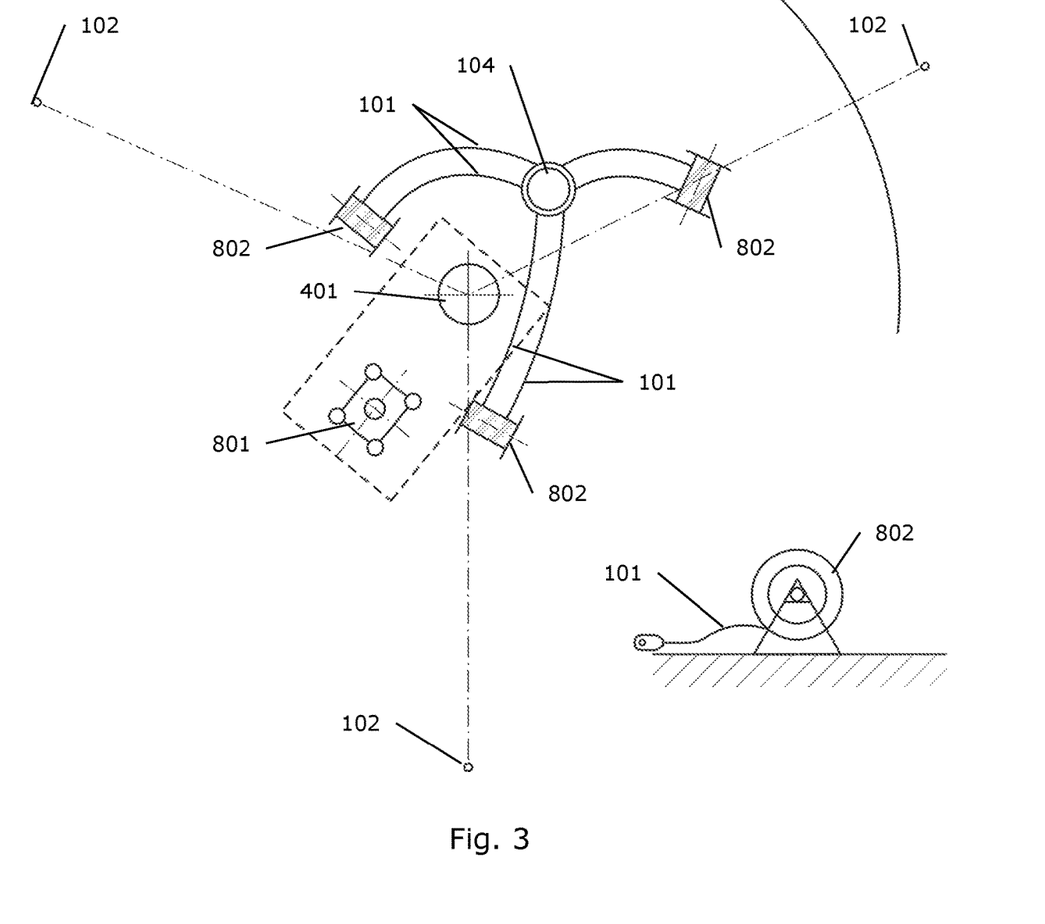
FIG. 3 is a sketch of a tower such as a wind turbine tower during erection as seen from above.
Figure 4:
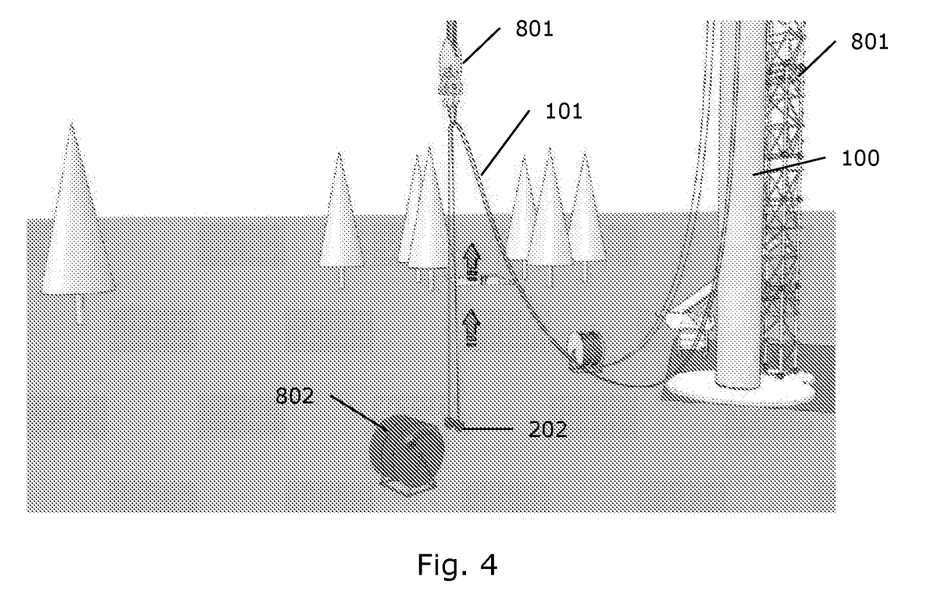
FIGS. 4-8 illustrate different stages during erecting of a tower according to embodiments of the invention.

FIG. 3 is a sketch of how the wind turbine tower can be erected and as seen in a top view. A first tower section 401 of the tower has been positioned and the cables 101 have been attached to the second tower section 104 optionally with a portion of the cables still being rolled onto cable drums 802. Here, two cables to be attached to the same anchor element 102 are rolled onto the same cable drum 802. Each cables may alternatively be rolled onto separate cable drums. The anchor blocks with the anchor elements are all placed as desired relative to the tower. Preferably, the anchor blocks are placed with the same distance to the wind turbine tower. However, even in that case the cable lengths may vary some length due to the possibility of level differences between the anchor blocks. A crane 801 then lifts the second tower section 104 with the attached cables 101 onto the first tower section 401 and the tower sections are joined. The crane 801 may then advantageously be used to lift each cable drum 802 with the second cable ends, or alternatively lift the cable free from the drum and out from the tower as close as possible to the location of the anchoring elements 102. In this way the crane can lift the cables over trees or other types of vegetation or obstacles without having to clear a path on the ground. This is illustrated in FIG. 4.

Figure 5:
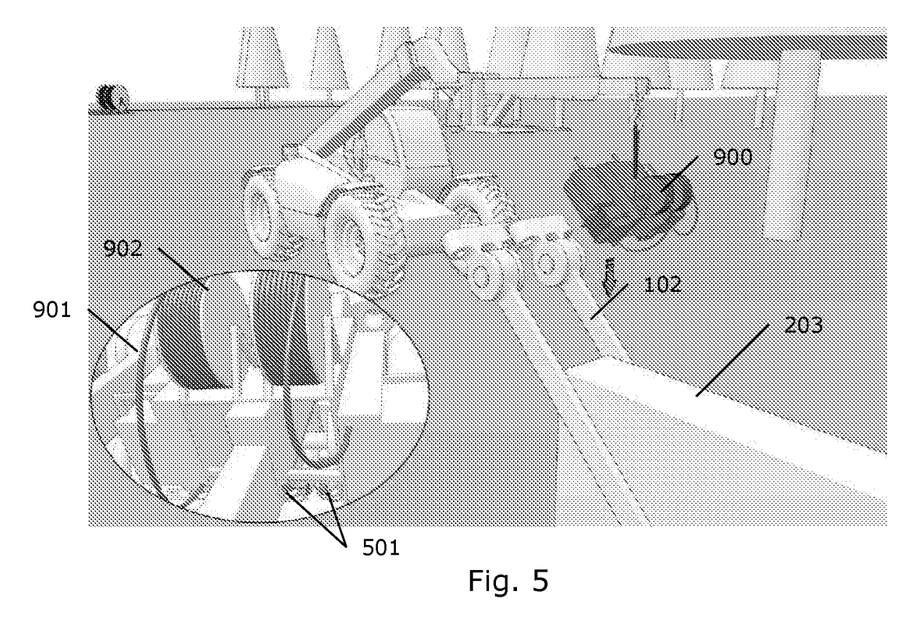

The method of erecting the tower includes the use of a motorized winch 900 to connect and attach the cable to an anchor block. This is illustrated in FIGS. 5-8. An example of a motorized winch 900 is shown in more details in FIG. 9. The winch 900 comprises a winch cable 901 to be wound off and onto a spool 902 by a motor 903. The winch may be operated by an electrical motor, a hydraulic motor, or the like. The end of the winch wire is equipped with a stud 904 configured to mate with and be attached to the second end 202 of tether cable 101 of the tower. The winch is further configured and prepared to be detachably attached to an anchor block 203 and/or the anchoring element 102 on an anchor block. This is illustrated in FIG. 5, wherein the insert shows the winch 900 attached to the anchoring element 102 and secured with bolts 501. The winch 900 shown in the FIGS. 5 and 7-9 is a double winch with two spools 902 and two wires 901. The two wires may be operated wound up at the same time and at the same speed. The winch with the double set of spools and wires is built up by two identical winches on a common framework 905. The framework is configured to mate the anchor block or anchoring element to which the winch is to be attached for easy and simple attachment of the winch. Also, the framework mating the anchor block or anchoring element aid in positioning the winch correctly to pull the wires in the desired direction.

Figure 6:
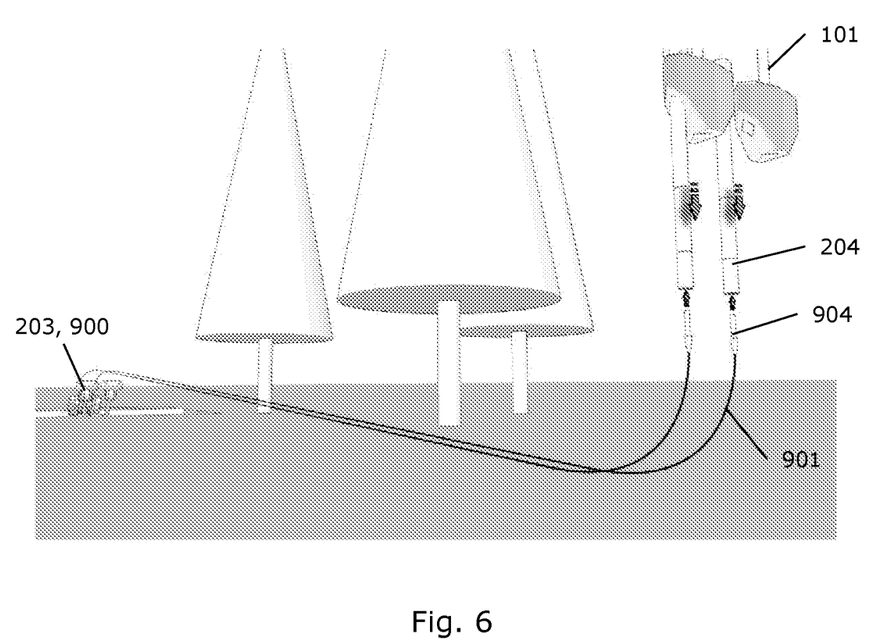
Figure 7:
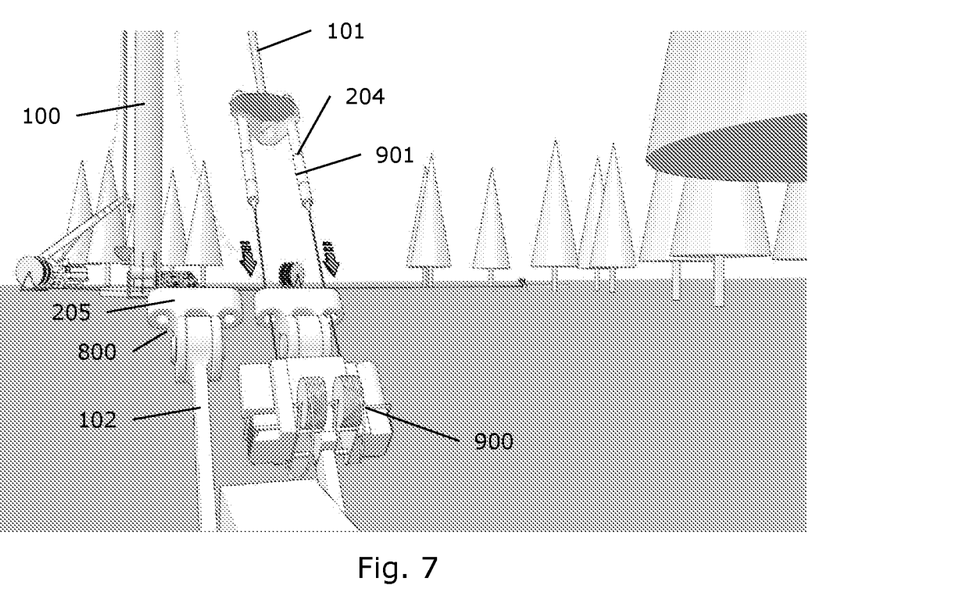
Figure 8:
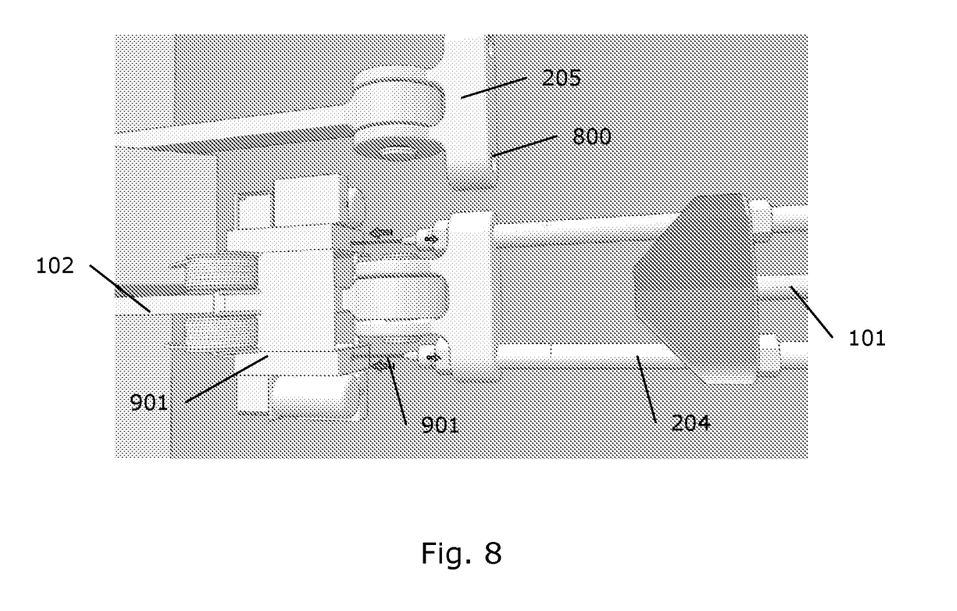
Figure 9:
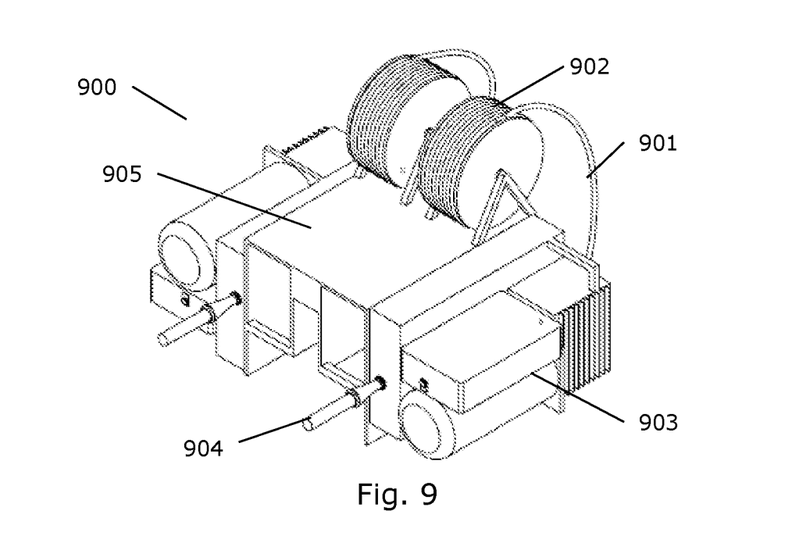
FIG. 9 is a sketch of a motorized winch for use in connecting the cables according to an embodiment of the invention.

As illustrated in FIGS. 5-7 the wire ends 904 of the winch 900 are guided through the openings 800 in the block socket 205 of the anchoring element. The openings 800 are configured for receiving the cable studs 204 in the second end 202 of the cable 101 for fastening the cable to the anchoring element. The winch wires are then wound or drawn off the spool and connected to the cable studs 204 where they are and probably at some location between the tower and the anchor block (see FIG. 6). In the shown embodiment, the cable 101 comprises two cable studs at its end, and one winch wire in the connected to each stud. The winch (single or double) is then operated to wind up the winch cable(s) 901 thereby pulling the tower cable 101 towards the anchor block and into position to be fastened to the anchoring element. The winch wire can be retracted an amount so that the cable stud(s) of the tower cable is pulled through the opening in the block socket and can be fastened and secured to the anchoring element while still held in position by the winch wire(s).

After the tether cable 101 has been secured to the anchoring element, a pre-load tension can be applied on the cable by means of a tensioning tool. The winch may be detached from the anchor block and reused at another anchor block as soon as the cable is secured to the anchoring element.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of erecting a wind turbine tower on a base, the wind turbine tower configured to be tethered by a plurality of cables and configured to support a wind turbine nacelle and a rotor, each of the plurality of tethering cables configured to extend between a first end attached to an attachment element on the tower and a second end attached to an anchoring element on an anchor block spaced from the base, the method comprising:
    attaching the first end of the plurality of tethering cables to an attachment element of the tower,
    detachably fastening a motorized winch on an anchor block, the winch comprising a wire on a spool,
    connecting the wire of the winch to the second end of one or more of the plurality of tethering cables,
    winding up the wire of the winch pulling the second end of the one or more of the plurality of tethering cables towards the anchor block and into position for fastening the second end of the one or more of the plurality of tethering cables to the anchoring element of the anchor block, fastening the second end of the one or more of the plurality of tethering cables to the anchoring element of the anchor block while held in position by the winch, and detaching the winch wire from the one or more of the plurality of tethering cables.

2. The method according to claim 1, wherein the tower comprises a number of tower sections joined to each other, and the attaching the first end of the plurality of tethering cables to the tower comprises:

positioning a first tower section, providing a second tower section on the ground, the second tower section including the attachment element of the tower, attaching the first end of each tethering cable to the attachment element on the second tower section while the second tower section is on the ground, lifting the second tower section with the attached cables onto the first tower section, and joining the second tower section to the first tower section.

3. The method according to claim 2 wherein a third tower section is lifted onto and attached to the second tower section.

4. The method according to claim 1, wherein each of the plurality of tethering cables in its second end comprises a cable stud and the anchoring element comprises a block socket with an opening for receiving the cable stud, and wherein the method further comprises guiding the wire of the winch through the opening in the block socket before being connected to the cable stud.

5. The method according to claim 1, wherein the method further comprises attaching a tensioning tool to the one or more of the plurality of tethering cables and pre-tensioning the one or more of the plurality of tethering cables to a first pre-tensioning value by means of the tensioning tool.

6. The method according to claim 5, wherein the method further comprises pre-tensioning the one or more of the plurality of tethering cables to a second pre-tensioning value by means of the tensioning tool.

7. The method according to claim 1, wherein the winch is fastened to the anchoring element on the anchor block.

8. The method according to claim 1, wherein the motorized winch comprises a pair of spools with a wire on each spool, and wherein the pair of spools are arranged to be operated in unison to wind up the two wires in unison at the same speed.

9. The method according to claim 8, wherein each of the plurality of tethering cables in its second end comprises a cable stud and the anchoring element comprises a block socket with two openings for receiving two cable studs, and wherein the method further comprises guiding a wire of the winch through each of the two openings in the block socket before being connected to each of the two cable studs.

10. The method according to claim 1 further comprising positioning the tower at least partially by means of a crane and further using the crane to lift the second end of the one or more of the plurality of tethering cables and move it closer to the anchor block.

11. The method according to claim 1, wherein each of the one or more of the plurality of tethering cables is pre-tensioned to a value in the interval of 30-55% of their nominal strength.

* * * * *